(12) United States Patent
Shepherd et al.

(10) Patent No.: US 8,233,180 B2
(45) Date of Patent: Jul. 31, 2012

(54) METHODS FOR AUTOMATICALLY DETERMINING WORKFLOW FOR PRINT JOBS

(75) Inventors: Michael David Shepherd, Ontario, NY (US); Vishal Monga, Webster, NY (US); Dale Ellen Gaucas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 760 days.

(21) Appl. No.: 12/366,045

(22) Filed: Feb. 5, 2009

(65) Prior Publication Data

US 2010/0195140 A1    Aug. 5, 2010

(51) Int. Cl.
*G06F 3/12*    (2006.01)
*G06K 15/00*    (2006.01)

(52) U.S. Cl. ............. 358/1.15; 358/1.13; 358/1.14; 358/1.16; 358/1.18

(58) Field of Classification Search .......... None
See application file for complete search history.

(56) References Cited

U.S. PATENT DOCUMENTS

| | | | |
|---|---|---|---|
| 2006/0036934 A1* | 2/2006 | Fujiwara | 715/500 |
| 2006/0253213 A1 | 11/2006 | Ocke et al. | 700/97 |
| 2008/0082702 A1* | 4/2008 | Ohtsu | 710/33 |

* cited by examiner

*Primary Examiner* — Benny Q Tieu
*Assistant Examiner* — Haris Sabah
(74) *Attorney, Agent, or Firm* — Luis M. Ortiz; Kermit D. Lopez; Tuesday A. Kaasch

(57) ABSTRACT

A method automatically determines a workflow for a print job via analysis of PDF documents is disclosed. A job synopsis comprising hashed information of a historical print job's document content along with a PDF document-level and object-level metadata and information about workflow nodes and parameters can be stored in a database. The job synopsis of a new incoming print job can then be compared to the historical print job synopses database. If the new print job matches the historical print job within a certain predefined similarity limit, then workflow and parameter information associated with the historical job can be utilized to augment an initial workflow for the incoming print job.

20 Claims, 8 Drawing Sheets

Contact Name
My Realty Company
123 Main Street
Anywhere, OR 54321
123.456.7890
contact@email.com

◄—525

 —520

Can you afford to live exactly where you want?
Visit www.mywebsite.com to see what the properties are selling for in your favorite neighborhood. Or, if you want to know the appreciation of your home, give me a call and I'll provide you with an analysis of your home's value.

Let me help you plan your next move. Remember, my website is available 24 hours a day. Let me know if I can help with any of your real estate needs.

Contact Name

FIG. 5B

Michael Shepherd ←625
Sell-a-house
45 81st Street
Kansas City, MO 64114
816.555.2258
realtor@sellahouse.com

 ←620

Can you afford to live exactly where you want?
Visit www.sellahouse.com to see what the properties are selling for in your favorite neighborhood. Or, if you want to know the appreciation of your home, give me a call and I'll provide you with an analysis of your home's value.

Let me help you plan your next move. Remember, my website is available 24 hours a day. Let me know if I can help with any of your real estate needs.

Michael Shepherd

FIG. 6B

METHODS FOR AUTOMATICALLY DETERMINING WORKFLOW FOR PRINT JOBS

TECHNICAL FIELD

Embodiments are generally related to print job management in production printing environments. Embodiments are also related to print product descriptions and process workflows. Embodiments are additionally related to methods for determining workflow for print jobs.

BACKGROUND OF THE INVENTION

JDF (Job Definition Format) is an open, extensible, XML-based print workflow specification framework. JDF can be utilized to enable integration of commercial and planning applications into a technical workflow. JDF begins job definition from a product intent, which allows customers to describe an end product without having to specify the details, and ends with process specifications. The product descriptions can capture the customer's product intent, in addition to processing. Product description formats such as, for example, JDF product intent nodes, are intended to formalize the description of a product to make translation to a workflow easier.

The JDF product intent defines the product description of the final product to be produced by the production shop. The JDF intent to process conversion system automatically transforms the product description into a process network with a set of instructions. For example, a JDF product description representing a business card can be automatically transformed into an imposition process followed by a print process that can be executed to manufacture the business cards. The product description in general can be classified into a product type such as, for example, business card, post card, greeting card, calendar, perfect bound book and the like, for each print job. Each defined print product type comprises a set of assertions and/or conditions, which provide that an incoming product description can be classified into the product type.

An incoming job can be processed via a workflow associated to the product type if the product type of the incoming job is known via a rule-based classification mechanism. Such product type can then be utilized to select and parameterize the workflow for the process of the JDF print job. The conditions that determine the product type of the print job are based on job metadata description of the final print product such as, for example, number of pages, final size of the product, type of binding, etc The print job's product description of intent, however, may be insufficient to determine the nodes and their parameterizations that are required in a workflow to produce the product.

Based on the foregoing it is believed that a need exists for an improved methods and systems for automatically determining workflow for print jobs as described in greater detail herein. Additionally, a need exists for providing a methodology, which enables print product descriptions to be effectively and rapidly transformed into a desired end product.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for improved intent to process conversion methods.

It is another aspect of the present invention to provide improved methods for determining workflow for print jobs.

It is another aspect of the present invention to provide for an improved automated system for determining workflow for print jobs.

It is a further aspect of the present invention to provide for an improved method and system for automatic determination and enhancement of a workflow for a print job utilizing PDF analysis.

The aforementioned aspects and other objectives and advantages can now be achieved as described herein. A method and system for automatically determining a workflow for a print job via analysis of PDF documents is disclosed. A job synopsis comprising hashed information of a historical print job's document content along with a PDF document-level and object-level metadata and information about workflow nodes and parameters can be stored in a database. The job synopsis of a new incoming print job can then be compared to the historical print job synopses database. If the new print job matches the historical print job within a certain predefined similarity limit, then workflow and parameter information associated with the historical job can be utilized to augment an initial workflow for the incoming print job.

The predefined constituent object types and object-level metadata can be extracted from the historical print jobs in order to compute fixed length hashes. A calculation can be made to determine similarity of the incoming job and the historical jobs of each product type. If a historical job matches the incoming job within a certain predefined similarity limit, then workflow and parameter information associated with the historical job can be utilized for converting the incoming print job from a product description (intent) to workflow steps (process). The augmentation generally includes addition of a new node such as, for example, a color correction node, addition of specific parameter values to an existing node such as a rendering-intent half tone parameter value for a print node and the like.

Additionally, further analysis can also be done to determine which specific object-level hashes and metadata are similar, when the incoming job is similar to the historical job. Such information, along with the workflow associated with the historical job, can be utilized to guide the augmentation of the workflow for the incoming job. The fixed length hashes can be computed from the extracted object data utilizing a hashing algorithm. Additional criteria can also be evaluated through analysis of the print job document(s) when automatically processing print jobs. Such an augmentation process can be a rules-based system that utilizes knowledge about the object-level hashes that are similar between the historical and the incoming job, and knowledge of the differences between the historical workflow and the proposed workflow for the incoming job.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 5A and 5B illustrates a front view and a back view of a post card, which can be implemented in accordance with an exemplary embodiment; and FIGS. 6A and 6B illustrates a front view and a back view of a post card, which can be implemented in accordance with an exemplary embodiment.

DETAILED DESCRIPTION

The particular values and configurations discussed in these non-limiting examples can be varied and are cited merely to illustrate at least one embodiment and are not intended to limit the scope of such embodiments.

Figure 1:
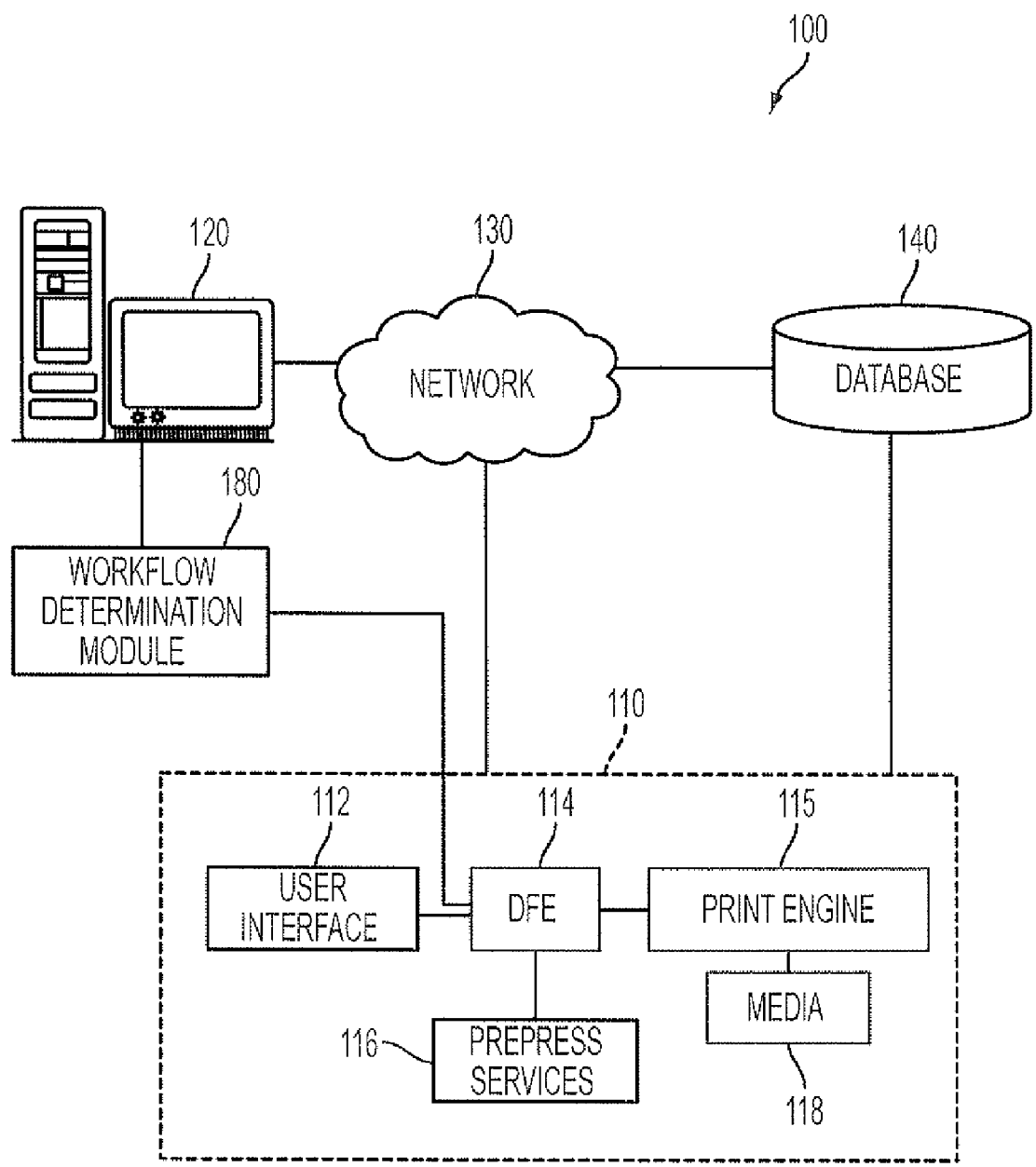
FIG. 1 illustrates a block diagram of a process conversion system, which can be utilized for automatically determining workflow for print jobs utilizing object level hash tables, in accordance with a feature of the present invention.

FIG. 1 illustrates a block diagram of a process conversion system 100, which can be utilized for automatically determining workflow for print jobs utilizing object level hash tables, in accordance with a feature of the present invention. FIG. 1 is provided as an exemplary diagram of a process conversion system 100 in which embodiments of the present invention may be implemented. It should be appreciated that FIG. 1 is only exemplary and are not intended to assert or imply any limitation with regard to the environments in which aspects or embodiments of the present invention may be implemented. Many modifications to the depicted environments may be made without departing from the spirit and scope of the present invention. A printing device 110 comprises a user interface 112, a digital front end 114, and a print engine 115. One or more application programs, such as—workflow determination module 180—, may be "loaded" for execution by the printing device 110. The printing device 110 receives user commands and data through the user interface 112.

The interface 112, which is preferably a graphical user interface (GUI), also serves to display results, whereupon the user may supply additional inputs or terminate the session. Application module 180, on the other hand, can include instructions, such as the various operations described herein with respect to the various components and modules described herein, such as, for example, the methods 300 and 400 depicted in FIGS. 3-4. The user interface 112 can be utilized as a communicating medium between a user and the printing device 110 for accessing different functions. The user interface 112 communicates with the digital front end 114 which include access to the module 180 for determining the workflow of a print job. The digital front end 114 can be embodied in software and can also enable image processing and control function. Various prepress services 116 can be invoked from the MIS or other print job controller.

The print engine 115 has access to media 118 of various size and cost, which enables integrated end to end PDF workflows for printing objects such as, for example, graphical pictures and the like. The module 180 determines the workflow of the submitted print jobs, which can be printed utilizing the printing device 110. A user can operate the printing device 110 utilizing the user interface 112 or through a work station 120. The workstation 120 can communicate with the printing device 110 utilizing a communications network 130. A user profile, work product for printing, media library and print job parameters can be stored in a database 140 or memory also accessible by the workstation 120 or printing device 100 via the network 130, or which can be directly accessed via the printing device 100.

Figure 2:
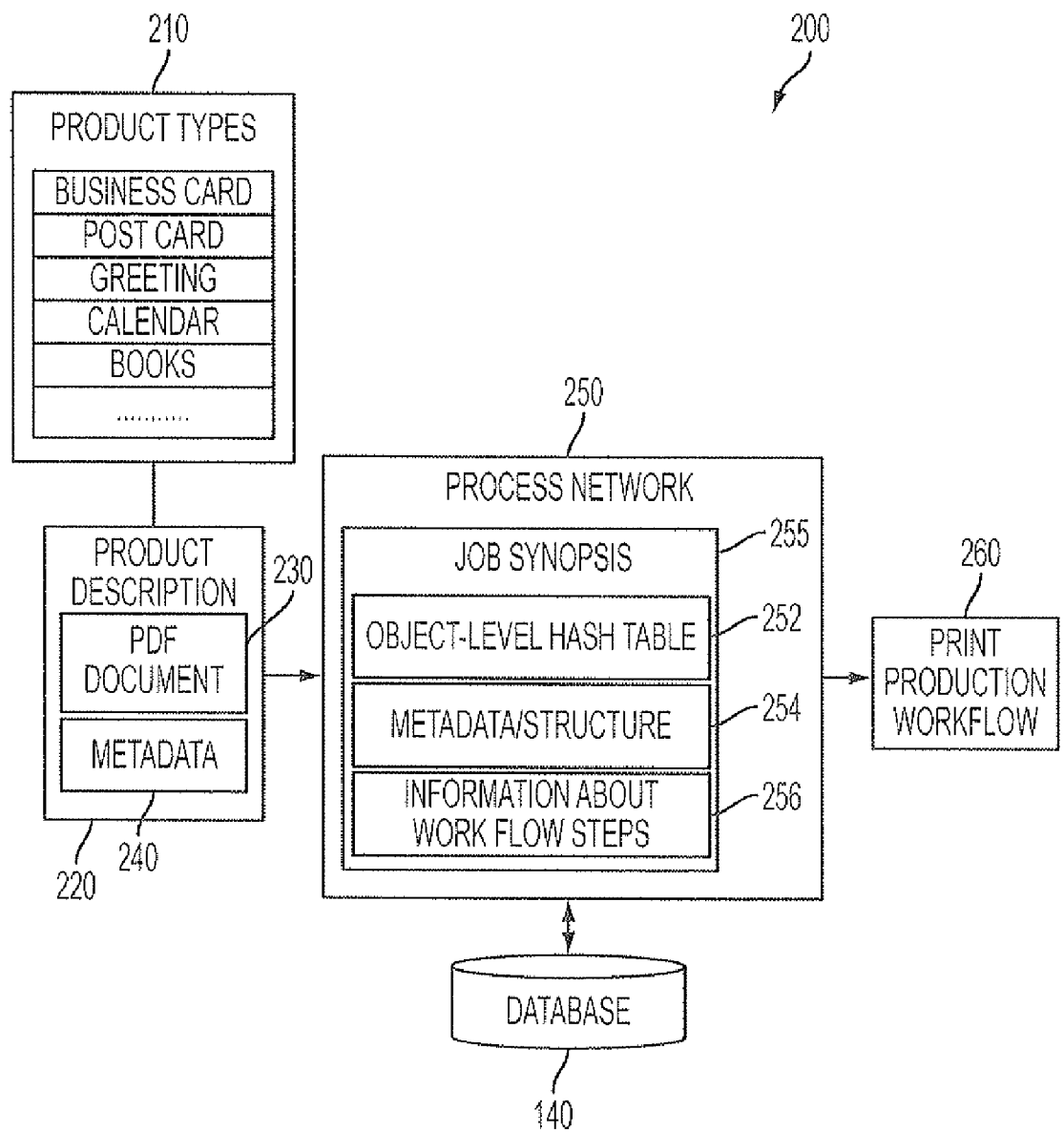
FIG. 2 illustrates a block diagram of the overall workflow utilized in determining workflow for a print job, in accordance with another feature of the present invention.

FIG. 2 illustrates a block diagram 200 of the overall workflow for automatically determining a workflow for a print job, in accordance with another feature of the present invention. Note that in FIGS. 1-4, identical or similar blocks are generally indicated by identical reference numerals. A print product description 220 associated with a print job can be in the form of JDF (Job Definition Format) product nodes for describing products and processes utilized in print shops. The product description 220 generally includes intent parameters of product characteristics such as, for example, binding, color models, finished size and references to artwork content such as PDLs and supporting data files such as images, fonts, profiles, etc. The print jobs can be submitted as a PDF (Portable Document Format) document 230. The print jobs can include, but are not limited to, alternate document formats that allow individual access to the various components of the document. The use of the PDF format 230 as disclosed herein is for illustrative purposes only and is not considered a limiting feature of the embodiments. The product description 220 can be analyzed in order to produce a classification of a product type 210 for the print job. Examples of product types include business card, post card, greeting card, calendar, perfect bound book, etc. The product type 210 can then be utilized to select and parameterize the workflow for the print job.

The product description 220 can be utilized for process network generation 250. For example, the product description 220 may reference a PDF file 230. The PDF file 230 may include an XMP-based tag that labels a JPEG component, for example such as a "golf tournament", as asset metadata 240. The PDF supports eight basic types of objects such as Boolean values, integers and real numbers, strings, names, arrays, dictionaries, streams and null objects. The object level metadata/structure includes objects in classes such as, for example, tag, positioning, size and the like, whereas the document level metadata/structure may belong to the document of the PDF such as number of pages, creation date and the like. The process network 250 results in a job synopsis 255 that includes object level hash tables 252 along with PDF document-level and object-level metadata/structure 254 and information about workflow nodes and parameters 256 associated with the print job. The job synopsis 255 associated with print jobs can be stored in a database 140. The metadata/structure 254 comprises object level metadata/structure and document level metadata/structure.

The information in the workflow 260 includes parameters which can be utilized for the processing of the job to create a similar product type such as business card, post card, greeting card, calendar and the like. The job synopsis 255 of the newly encountered job can be compared with that of the processed job, and if more than predefined hash values in the hash table 252 match those of the processed job then the newly encountered job can be sent to the print production workflow 260 similar to the processed job. The job synopsis 255 can provide the additional criteria when processing the print jobs in the workflow 260.

Figure 3:
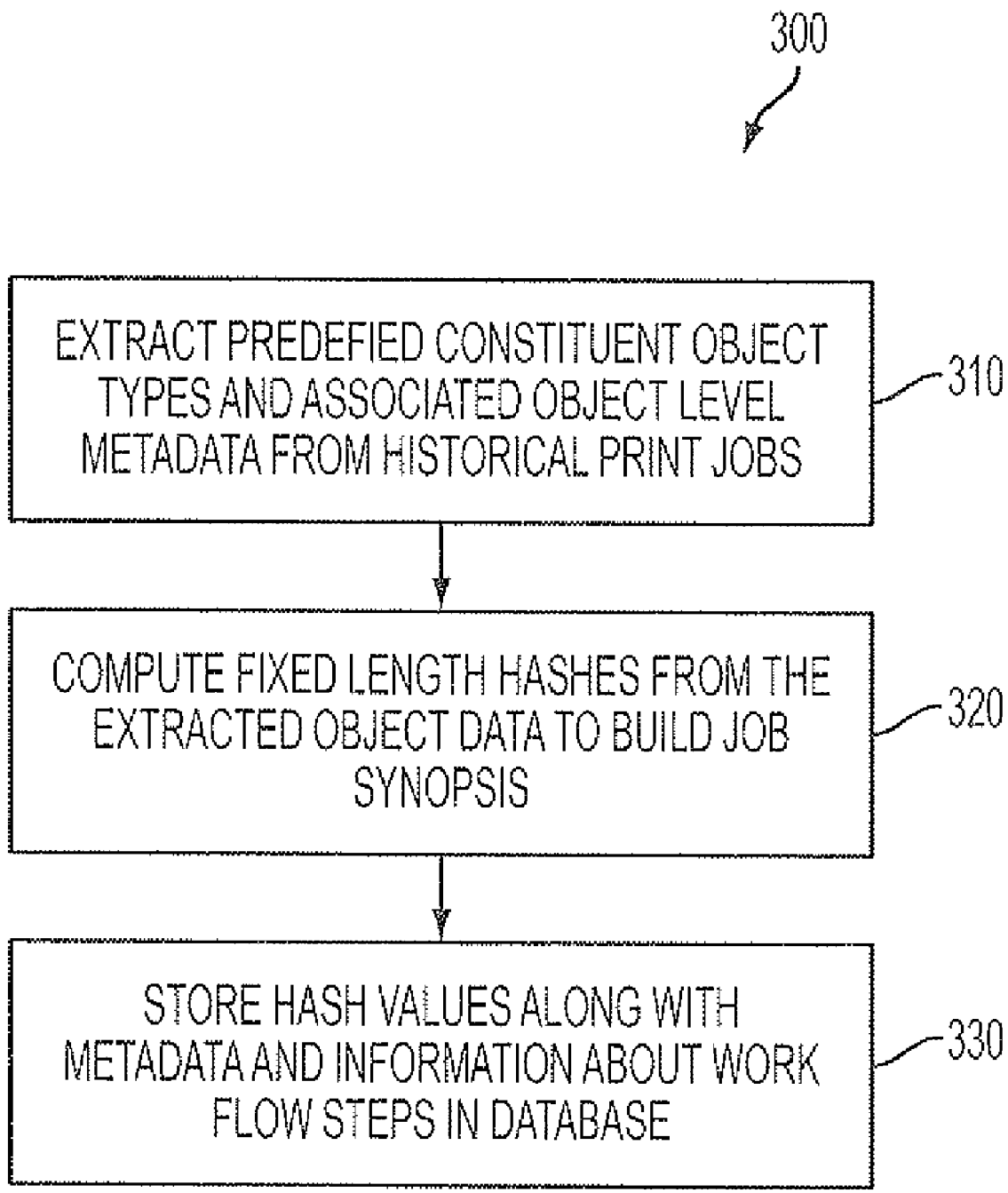
FIG. 3 illustrates a high level flow chart of operations illustrating logical operational steps of a method for generating and storing job synopsis for historical print jobs, which can be implemented in accordance with a preferred embodiment.

FIG. 3 illustrates a high level flow chart of operations illustrating logical operational steps of a method 300 for generating and storing job synopsis 255 for print jobs, which can be implemented in accordance with a preferred embodiment. The predefined constituent object types and object level metadata 240 can be extracted from the historical print jobs, as shown at block 310. The objects can be images, pantone colors, line art and the like in the PDF document. Note that the historical jobs are print jobs that are gathered and stored in the workflow system 200. Thereafter, as illustrated at block 320 fixed length object-level hash tables 252 can be computed for the extracted object data to build print job synopsis 255. The hash tables 252 along with the metadata/structure 254 and information about the workflow steps 256 can be stored in the database 140, as depicted at block 330.

Figure 4:
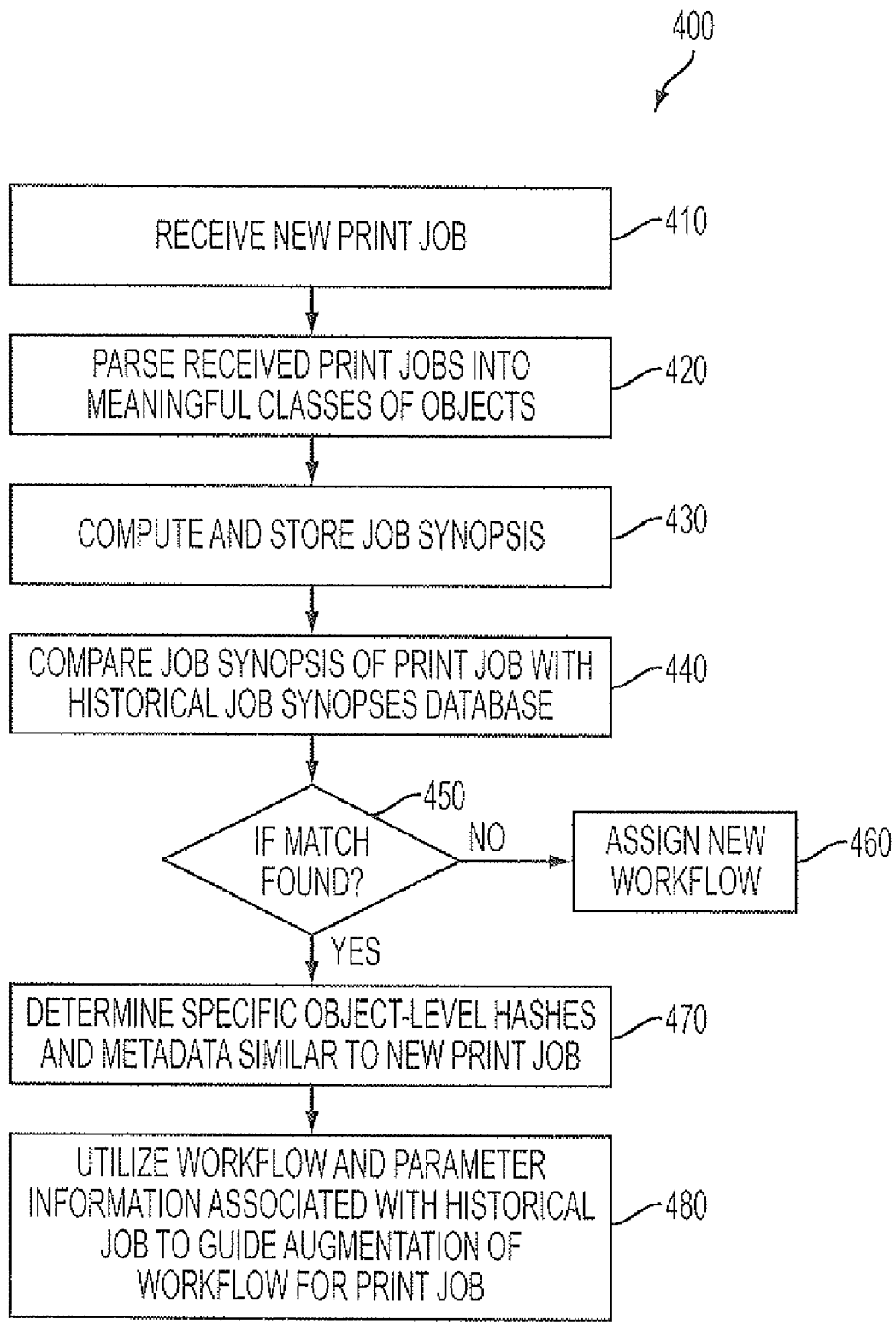
FIG. 4 illustrates a detailed flow chart of operations illustrating logical operational steps of a method for automatically determining a workflow for a print job via analysis of PDF documents, which can be implemented in accordance with the preferred embodiment.

FIG. 4 illustrates a detailed flow chart of operations illustrating logical operational steps of a method 400 for automatically determining a workflow for a print job via analysis of PDF documents, which can be implemented in accordance with the preferred embodiment. The print jobs can be received, as illustrated at block 410. The received print job can be parsed into meaningful classes of objects, as shown at block 420. A job synopsis associated with the print job can be stored, as shown at block 430. The job synopsis of the print job can be compared to the historical job synopses database 140, as illustrated at block 440. A determination can be made if the job synopsis of the received new job matches the historical job, as illustrated at block 450. If the job synopsis of the new job matches the historical job, the specific object level hashes and metadata similar to the print job can be determined, as shown at block 470.

The workflow and parameter information associated with the historical job can be utilized to guide augmentation of workflow for the new print job, as depicted at block 480. Otherwise, a new workflow can be assigned to the new print job for processing, as shown at block 460. A calculation can be made for the similarity of the new incoming job with the historical jobs of each product type. If a historical job matches the incoming job within a certain predefined similarity limit, then workflow and parameter information associated with the historical job is used to augment the initial workflow determined by the job. The augmentation may involve the addition of a new node such as a color correction node, or the addition of specific parameter values to an existing node such as a rendering-intent half tone parameter value for a print node. More specifically, the job synopsis 255 consists of object-level hashes for the different object classes within a print job submitted as a PDF file such as images, pantone colors, line art.

A synopsis also consists of object PDF metadata/structure 254 (e.g., tags, positioning, size, etc.) and document level PDF metadata/structure 254 (e.g., number of pages, creation date, etc.). When a submitted job is determined to be similar to the historical job, a further analysis can be done to determine which specific object-level hashes and metadata are similar. The information, along with the workflow associated with the historical job, can be utilized to guide the augmentation of the workflow for the submitted job that was defined by the intent to process system. The augmentation process can be a rules-based system that utilizes knowledge about the object-level hashes that are similar between the historical and submitted job, and knowledge of the differences between the historical workflow and the proposed intent to process workflow for the submitted job.

A possible rule can be for example, if the matched processed job and the new job are similar for a pantone colors hash value and the processed job workflow has a color correction node and the submitted job workflow does not possess a color correction node then a color correction node can be added to the new job workflow with the parameters in the processed job workflow. Another possible rule can be for example, if the matched processed job and the new job are similar for a line art hash value and the processed job workflow has a print node with a rendering intent parameter value for a half tone selection and the new job workflow does not possess a rendering intent parameter value for the print node then a rendering intent parameter value can be added to the print node in the job workflow corresponding to the parameter in the print node in the historical job workflow. An alternative flow can be that if the processed job matches the new job within a certain predefined similarity limit, then the complete workflow for the processed job can be utilized for the new job.

Figure 5A:
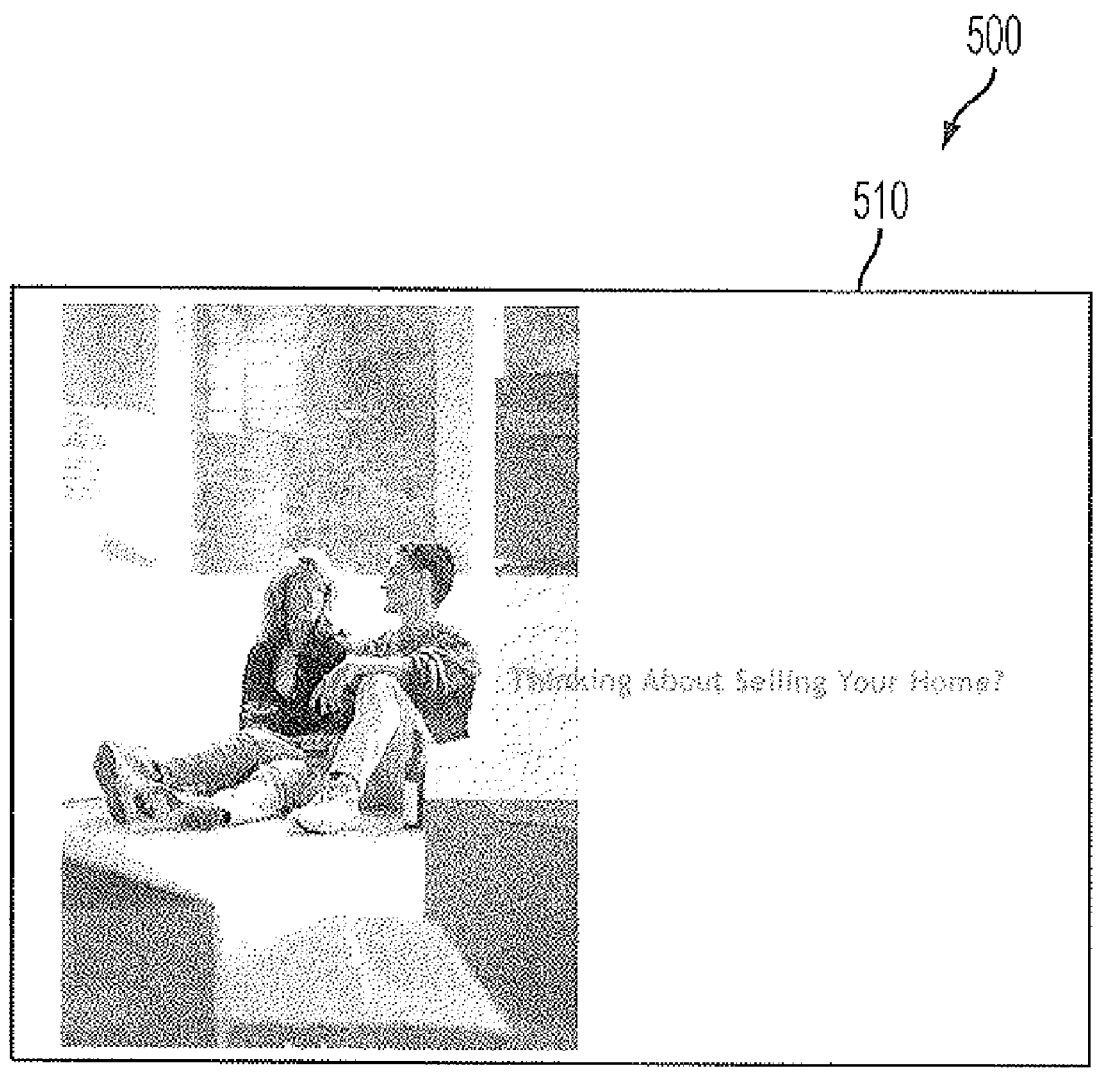

FIGS. 5A and 5B illustrate a front view and a back view of a post card 500, which can be implemented in accordance with an exemplary embodiment. The post card 500 can be extracted and submitted as the print job in electronic form to the workflow system 200 with a PDF consisting of an image 510 on the front side, a graphic 520 and a text box 525 of address information on the back side. Each object in the PDF of the post card 500 can be processed by a hashing algorithm. For example, the front side image 510 produces a hash value of 15846 for the image contents. The backside graphic 520 produces a hash value of 76589 for the graphic's content. Similarly, hash values can be produced for the text box 525. The set of resulting hash values 252 can be formed into a job synopsis 255 along with document and object metadata/structure 254 and information of the steps for the workflow 256 can be processed and stored in the database 140 of the workflow system 200. Note that the "database" disclosed herein can be part of a more comprehensive job database, including additional information within each record for other purposes. The workflow for post card 500 consists of an image enhancement process for skin tone correction, a color management node for providing an iGen3 color profile, an imposition node to specify multi-up of the post card image on 17×11" media, and a print node targeting an iGen3 printer.

Figure 6A:
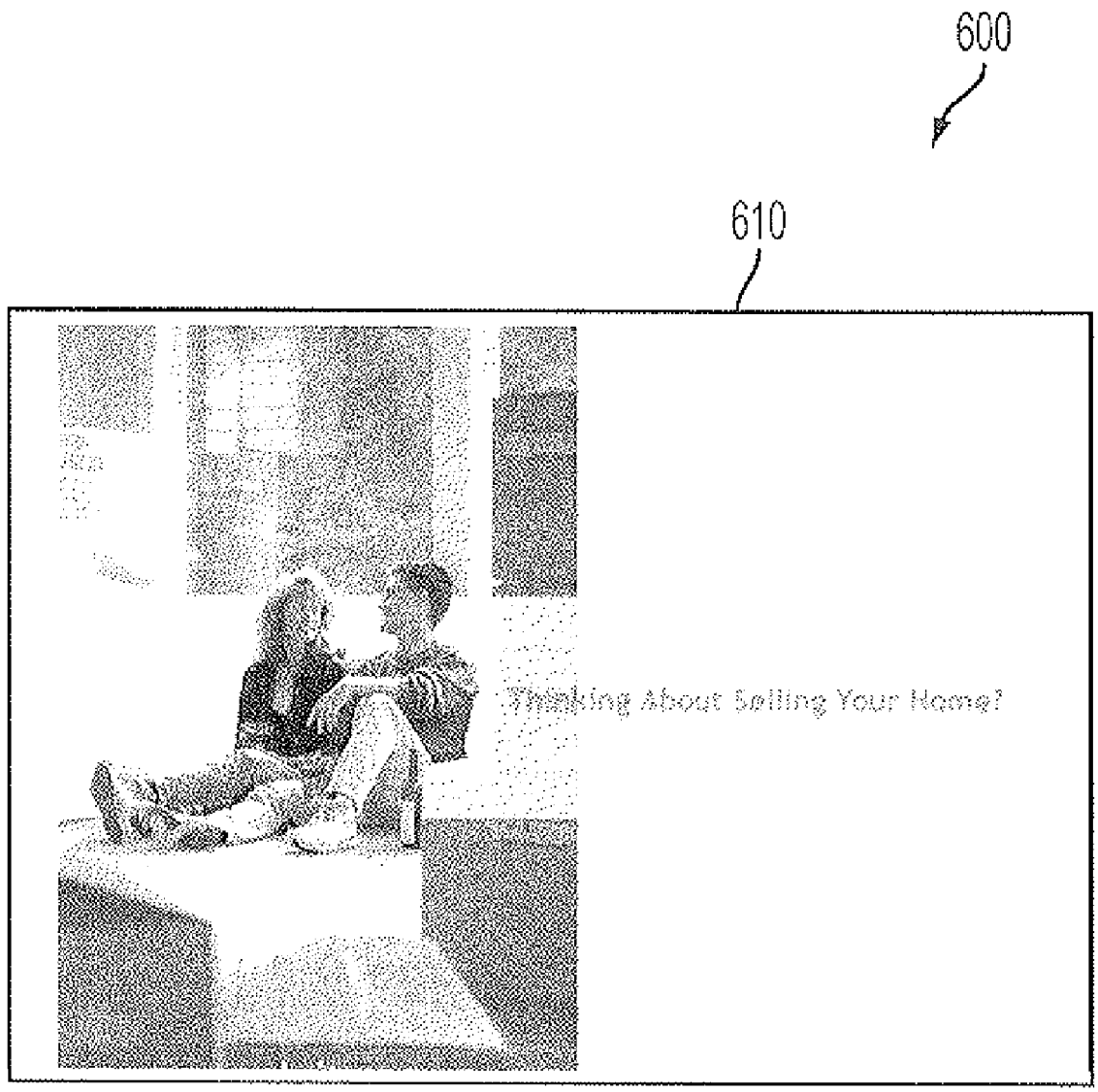

FIGS. 6A and 6B illustrate a front view and a back view of a post card 600, which can be implemented in accordance with an exemplary embodiment. The post card 600 can also be submitted as a print job to the workflow system 200 with a PDF consisting of an image 610 on the front side, a graphic 620 and a text box of address information 625 on the back side. Each object in the PDF can be processed by a hashing algorithm. The front side image 610 produces a hash value of 15846 for the image contents. The backside graphic 620 produces a hash value of 76589 for the graphic's content. Similarly, hash values can be produced for the text box 625. The set of resulting hash values can be formed into a job synopsis 255 along with document and object level metadata/structure 254 and can be compared with historical knowledge base of job synopses in the database 140. Note that the hash values are described for exemplary purposes; however, they should not be interpreted in any limiting way.

For example, the two post cards 500 and 600 possess similar object-level hashes for the front-page images, pantone colors, and some text boxes. Because of their similar structure and layout, they also have similar document-level and object-level metadata. The job synopsis of the post card 600 matches with the job synopsis of the post card 500 hence the workflow of the print job 500 can be assigned to the post card 600. Alternatively if more than one print job is matched with the processed jobs, then the workflow system, which processed all the similar jobs, can be assigned for processing the new job.

Based on the foregoing it can be appreciated that a system can be provided, through the use of one or more software modules as described above, which results in adding process description into print production workflows via analysis of PDF documents. The matching can be done by comparing the job synopses 255 comprising of hash tables 252, which are computed by utilizing the well-known database hashing functions hence the processing can be accurate and robust. The system described herein is a rule-based system, which provides image enhancement, and color management and also can retrieve the additional criteria of the product by automatically processing the print jobs.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically determining a workflow for a print job, comprising the steps of:
    analyzing a product description associated with said print job to determine a product type for said print job;
    generating a process network utilizing said product description to produce at least one job synopsis comprising a plurality of hash values for at least one historical print job along with a metadata structure and an information about a plurality of workflow nodes and parameters associated with said at least one historical print job;
    retaining said at least one job synopsis in a database record;
    comparing a job synopsis of a new print job to said at least one job synopsis associated with said at least one historical print job retained in said database record; and
    assigning at least one of said plurality of workflow nodes and parameters associated with said at least one historical print job to said new print job if said job synopsis of said new print job matches said at least one job synopsis of said at least one historical print job within a certain predefined similarity limit.

2. The method of claim 1 wherein retaining said at least one job synopsis comprising said plurality of hash values for at least one historical print job, further comprises:
    extracting a plurality of predefined object types and object level and document level metadata from said at least one historical print job and said new print job in electronic form.

3. The method of claim 1 wherein assigning at least one of said workflow nodes and said parameters associated with said at least one historical print job, further comprises:
    augmenting an initial workflow associated with said new print job with said workflow and said parameter information if said job synopsis of said new print job matches said at least one job synopsis within said certain predefined similarity limit.

4. The method of claim 1 wherein said at least one print job comprises a PDF document.

5. The method of claim 1 wherein said plurality of predefined object types comprises a content of said PDF document which includes a graphic object, a image object and a text object.

6. The method of claim 1 further comprising: processing said plurality of predefined object types utilizing a hashing algorithm.

7. The method of claim 1 further comprising: identifying said new print job that is repeated utilizing a user interface or a module.

8. The method of claim 1 wherein retaining said at least one job synopsis comprising said plurality of hash values for at least one historical print job, further comprises:
    extracting a plurality of predefined object types and object level and document level metadata from said at least one historical print job and said new print job in electronic form.

9. The method of claim 8 further comprising: processing said plurality of predefined object types utilizing a hashing algorithm.

10. The method of claim 1 wherein said at least one print job comprises a PDF document.

11. The method of claim 1 wherein said plurality of predefined object types comprises a content of said PDF document which includes a graphic object, a image object and a text object.

12. The method of claim 1 further comprising: processing said plurality of predefined object types utilizing a hashing algorithm.

13. The method of claim 1 further comprising: identifying said new print job that is repeated utilizing a user interface or a module.

14. A method for automatically determining a workflow for print jobs, comprising:
    analyzing a product description associated with said print job to determine a product type for said print job;
    generating a process network utilizing said product description to produce at least one job synopsis comprising a plurality of hash values for at least one historical print job along with a metadata structure and an information about a plurality of workflow nodes and parameters associated with said at least one historical print job;
    retaining said at least one job synopsis in a database record;
    extracting a plurality of predefined object types and object level and document level metadata from said at least one historical print job and said new print job in electronic form;
    comparing a job synopsis of a new print job to said at least one job synopsis associated with said at least one historical print job retained in said database record; and
    assigning at least one of said plurality of workflow nodes and parameters associated with said at least one historical print job to said new print job if said job synopsis of said new print job matches said at least one job synopsis of said at least one historical print job within a certain predefined similarity limit.

15. The method of claim 14 wherein assigning said at least one of said plurality of workflow nodes and said parameters associated with said at least one historical print job, further comprises:
    augmenting an initial workflow associated with said new print job with said workflow and said parameter information if said job synopsis of said new print job matches said at least one job synopsis within said certain predefined similarity limit.

16. The method of claim 14 wherein said at least one print job comprises a PDF document.

17. The method of claim 14 wherein said plurality of predefined object types comprises a content of said PDF document which includes a graphic object, a image object and a text object.

18. The method of claim 14 further comprising: processing said plurality of predefined object types utilizing a hashing algorithm.

19. The method of claim 14 further comprising: identifying said new print job that is repeated utilizing a user interface or a module.

20. A method for automatically determining a workflow for print jobs, comprising the steps of:
    analyzing a product description associated with said print job to determine a product type for said print job;
    generating a process network utilizing said product description to produce at least one job synopsis comprising a plurality of hash values for at least one historical print job along with a metadata structure and an information about a plurality of workflow nodes and parameters associated with said at least one historical print job;
    retaining said at least one job synopsis in a database record;
    comparing a job synopsis of a new print job to said at least one job synopsis associated with said at least one historical print job retained in said database record;
    assigning at least one of said plurality of workflow nodes and parameters associated with said at least one historical print job to said new print job if said job synopsis of said new print job matches said at least one job synopsis of said at least one historical print job within a certain predefined similarity limit; and
    augmenting an initial workflow associated with said new print job with said at least one workflow node and said parameters if said job synopsis of said new print job matches said at least one job synopsis within said certain predefined similarity limit.

\* \* \* \* \*